US006849340B1

(12) United States Patent
Dhaler et al.

(10) Patent No.: US 6,849,340 B1
(45) Date of Patent: Feb. 1, 2005

(54) CARBON-CURABLE SILICONE/ADHESIVE COMPLEX WHEREOF THE INTERFACE HAS RELEASE FORCE CAPABLE OF BEING MODULATED

(75) Inventors: Didier Dhaler, Tassin (FR); André Lievre, Saint-Genis-Laval (FR); Christian Mirou, Lyons (FR); Christophe Guyot, Lyons (FR)

(73) Assignee: Rhodia Chimie, Boulogne Billancourt (FR)

( * ) Notice: Subject to any disclaimer, the term of this patent is extended or adjusted under 35 U.S.C. 154(b) by 0 days.

(21) Appl. No.: 10/130,939

(22) PCT Filed: Nov. 24, 2000

(86) PCT No.: PCT/FR00/03293

§ 371 (c)(1),
(2), (4) Date: Aug. 29, 2002

(87) PCT Pub. No.: WO01/38450

PCT Pub. Date: May 31, 2001

(30) Foreign Application Priority Data

Nov. 26, 1999 (FR) ............................................. 99 14944

(51) Int. Cl.[7] ............................................... B32B 25/20
(52) U.S. Cl. .......................... 428/447; 528/32; 528/27; 525/477; 427/515
(58) Field of Search ........................... 428/447; 528/32, 528/27, 447; 525/477; 427/515

(56) References Cited

U.S. PATENT DOCUMENTS

| 4,576,999 | A | * | 3/1986 | Eckberg |
| 5,616,629 | A | | 4/1997 | Nguyen et al. |
| 5,650,453 | A | * | 7/1997 | Eckberg |

FOREIGN PATENT DOCUMENTS

| DE | 198 31 775 A | 1/1999 |
| EP | 0 476 925 A | 3/1992 |
| JP | 07-188631 | * 7/1995 |

* cited by examiner

Primary Examiner—Kuo-Liang Peng
(74) Attorney, Agent, or Firm—Burns, Doane, Swecker & Mathis, L.L.P.

(57) ABSTRACT

The invention concerns a silicone/adhesive complex including at least one silicone coating applied on a first support and an adhesive coating applied on a second support, wherein the release force of a silicone/adhesive interface is capable of being modulated. The invention is characterized in that its silicone coating results from polymerization and/or curing by cationic process of polyorganosiloxane monomers, oligomers and/or polymers bearing as reactive groups at least epoxy, oxetane, dioxolane and/or alkenylether functions and the silicone coating further includes at least an additive regulating the release force of a silicone/adhesive interface and whereof the activity is photochemically initiated and adjustable.

13 Claims, 10 Drawing Sheets

Figure 1:
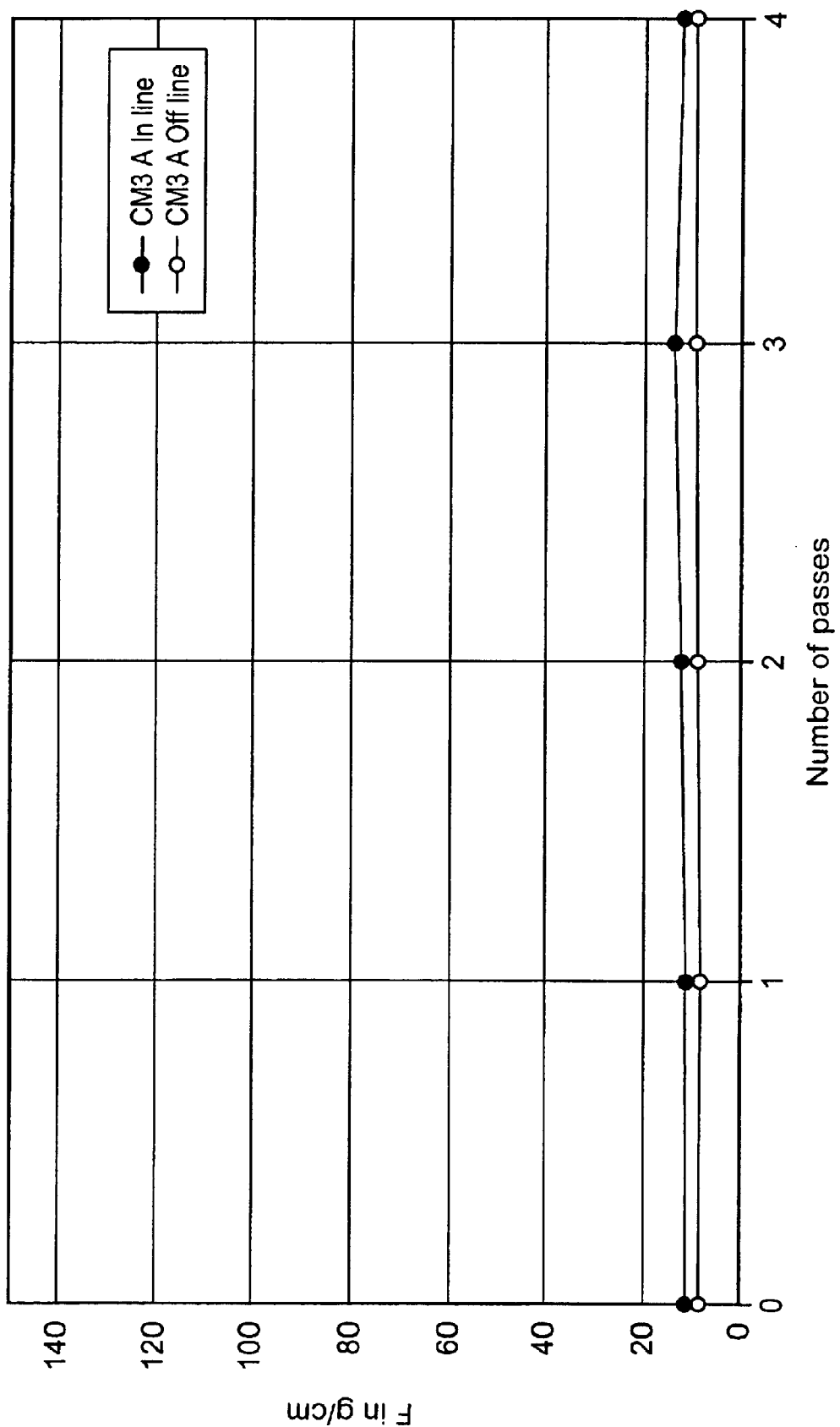

CARBON-CURABLE SILICONE/ADHESIVE COMPLEX WHEREOF THE INTERFACE HAS RELEASE FORCE CAPABLE OF BEING MODULATED

The present invention relates generally to "self-adhesive" complexes composed in particular of a non-stick silicone coating and of an adhesive coating.

This type of complex is generally intended for a use in which the crosslinked or polymerized silicone matrix is affixed to a backing so as to render it nonstick with respect to the adhesive. Complexes of this type find applications in particular in the field of adhesive protective papers, labels, decorative papers and adhesive tapes.

The silicone oils or resins provided for producing this type of coating with nonstick properties generally derive from cationic photo-crosslinkable systems. They are more particularly monomer(s), oligomer(s) and/or polymer(s) of polyorganosiloxane nature comprising functional and reactive radicals capable of forming intra- and intercatenary bridgings. These systems result, after polymerization under UV radiation or an electron beam and in the presence of a polymerization initiator, in nonstick coatings which form "self-adhesive" complexes with the adhesives which are applied to their surface after silicone treatment.

An essential characteristic of these silicone/adhesive complexes is therefore that they lend themselves to ready release of the adhesive coating from the silicone coating when they are used.

Depending upon the nature of the applications envisaged for this type of complex, it would be desirable to be able to adjust the release force necessary for the separation of the silicone coating from the adhesive coating.

In the case in point, this release force can be quantified. Although its values can vary significantly according to the measurement method used, it can be characterized overall as follows for a low rate of release, that is to say of the order of 30 cm/min and according to the FTM3 method:

- a release force of less than 15 g/cm is regarded as low,
- a release force of greater than 15 g/cm and less than 70 g/cm is regarded as average, and
- a release force of greater than 70 g/cm and preferably of less than 200 g/cm is regarded as high.

It is a specific subject matter of the present invention to provide a silicone/adhesive complex for which the release force can be adjusted as required and preferably to a value within the range stated above, namely between 15 g/cm and 200 g/cm.

More specifically, the present invention relates to the field of adhesive/silicone complexes polymerizable and/or crosslinkable by the cationic route and for which the release force of their silicone/adhesive interface is photochemically adjustable.

Patent application DE 198 31 775 A already discloses a silicone/adhesive complex with an adjustable release force. However, the ability of this complex to display an adjustable release force is related directly to the chemical nature of the silicone matrix. It derives from acrylic polyorganosiloxanes and exhibits acrylate crosslinking nodes. Depending upon its degree of crosslinking, this silicone matrix displays more or less significant adhesion with respect to the adhesive film which is combined with it. Furthermore, in this prior art, the presence of a chromium salt in the silicone matrix is required if this property is to be displayed.

For its part, the present invention is targeted in providing a silicone/adhesive complex for which the ability to display an adjustable release force is related to the presence of a specific additive within the silicone matrix.

More specifically, a first subject matter of the present invention is a silicone/adhesive complex comprising at least one silicone coating applied to a first backing and an adhesive coating applied to a second backing and for which the release force of a silicone/adhesive interface is adjustable, characterized in that its silicone coating derives from the polymerization and/or crosslinking by the cationic route of polyorganosiloxane monomers, oligomers and/or polymers carrying, as reactive groups, at least epoxy, oxetane, dioxolane and/or alkenyl ether functional groups and in that said silicone coating additionally comprises at least one additive for regulating the release force of a silicone/adhesive interface and for which the activity is photochemically initiated and adjustable.

The activation of the additive is preferably carried out by exposure, if not of the complex, of at least one silicone/adhesive interface to at least one irradiation, preferably photochemical.

The use of a polyorganosiloxane matrix in accordance with the invention to prepare the claimed complexes is particularly advantageous in comparison with a polyorganosiloxane matrix with acrylic functional groups insofar as its preparation does not require inerting. In contrast to acrylates, the radical crosslinking of which can be halted by the accidental presence of oxygen, the functionalized polyorganosiloxanes according to the invention are not sensitive to the surrounding atmosphere. It is not therefore essential for their crosslinking by the cationic route to take place in an inert atmosphere.

According to a first alternative form, the two backings are composed of two separate entities, positioned so that the silicone coating of the first backing is in contact with the adhesive coating of the second backing. This embodiment is illustrated in particular by "self-adhesive label" systems. In this specific case, the release force of the silicone/adhesive interface is exerted during the separation of the two backings.

In a second alternative form, the two backings are composed respectively of each of the two faces of the same entity. This second embodiment is illustrated in particular by "adhesive tape" systems. The nonstick coating, that is to say based on the silicone matrix, and the adhesive coating are brought into contact during the rolling of the backing over itself. In this case, the release force is exerted at the silicone/adhesive interface under the effect of the separation of a lower face with an upper face of the material.

According to a preferred form of the invention, the additive for regulating the release force of a silicone/adhesive interface used in the context of the present invention is selected from:

- organic acrylics,
- alkenyl ethers, and
- acrylic silicones and/or silicones with alkenyl ether functional groups.

Acrylate entities and in particular epoxidized acrylates, acrylic glyceryl polyesters, multifunctional acrylates, acrylic urethanes, acrylic polyethers, acrylic polyesters, unsaturated polyesters and acrylic acrylates are suitable in particular as organic acrylics.

Trimethylpentanediol triacrylate, trimethylolpropane triacrylate and tripropylene glycol diacrylate are more particularly preferred.

As regards the alkenyl ethers, they can be selected from cyclohexanedimethanol divinyl ether, triethylene glycol divinyl ether (DVE-3), hydroxybutyl vinyl ether, dodecyl vinyl ether and the other vinyl ethers sold by ISP and disclosed in particular in patent application WO 99/19371.

According to a preferred alternative form of the invention, this additive is selected from acrylic silicones and/or silicones with alkenyl ether functional groups.

Mention may more particularly be made, by way of representation of the silicone acrylic or methacrylic derivatives very particularly suitable for the invention, of the acrylic, methacrylic, ether and ester derivatives. Among these, polyorganosiloxanes with an acrylate and/or methacrylate functional group which are bonded to the polysiloxane chain via an Si—C bond are suitable in particular. Such acrylic derivatives are disclosed in particular in patents EP 281 718 and FR 2 632 960.

As regards the polyorganosiloxanes with an alkenyl ether functional group, they generally derive from a hydrosilylation reaction between oils comprising Si—H structural units and compounds carrying alkenyl ether functional groups, such as allyl vinyl ethers, allylvinyloxyethoxybenzene and similar compounds. Compounds of this type are referenced in particular in U.S. Pat. No. 5,340,898.

This additive is present in the silicone coating and is, of course, present in an amount sufficient to allow regulation of the release force for the adhesive/silicone interface. It can be present at up to 50% by weight of the silicone coating, expressed as dry matter.

However, the additive is preferably employed in a proportion of 0.1 to 20% approximately of the weight of the total silicone mixture. Of course, the amount of this additive is capable of significantly varying according to whether or not it has a silicone nature.

Thus it is that, in the specific case where this additive is an organic acrylic derivative or an alkenyl ether, its amount is generally between 0.1 and 10% approximately, preferably 0.5 and 5% approximately and more preferably 1 and 3%.

On the other hand, an additive of silicone type is preferably used at up to 20% by weight and preferably 15% by weight.

Furthermore, it appears that the amount of radiation, generally expressed in doses of radiation, preferably of UV type, is a useful parameter for adjusting the activity of the additive defined above and therefore for adjusting the level of the release force generated by this additive.

Thus it is that, in the examples which appear below, it is noted that the level of adhesion between the silicone coating and the adhesive which is combined with it is significantly increased after irradiation. Advantageously, the release force proves to be variable according to the number of passes under the UV lamps and thus of the UV energy received.

This UV energy can be dispensed by any appropriate device, either under the flash effect or the stroboscopic light effect. Mention may in particular be made, by way of illustration and without implied limitation of the sources of UV rays which can be employed to activate the additive, of microwave lamp or arc lamp UV systems.

Likewise, the concentration of additive dispersed within the silicone matrix appears as a parameter for varying this release force. This impact of the concentration of additive on the release force is illustrated in particular by the results which appear in the examples below.

Consequently, the invention has the advantage of providing a silicone/adhesive complex for which it proves possible to adjust the release force at the silicone/adhesive interface as a function, on the one hand, of the amount of additive incorporated and, on the other hand, of the amount of radiation applied to this interface.

As regards the silicone coating, it can derive from the polymerization and/or crosslinking of polyorganosiloxanes composed of units of formula (II) and terminated by units of formula (I) or cyclic polyorganosiloxanes composed of units of formula (II) represented below:

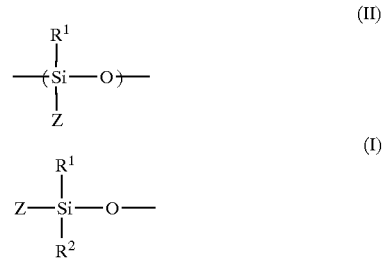

in which:

the symbols $R^1$ and $R^2$ are alike or different and represent:
- a linear or branched alkyl radical comprising 1 to 8 carbon atoms, optionally substituted by at least one halogen, preferably fluorine, the alkyl radicals preferably being methyl, ethyl, propyl, octyl and 3,3,3-trifluoropropyl,
- a cycloalkyl radical comprising between 5 and 8 cyclic carbon atoms, which radical is optionally substituted,
- an aryl radical comprising between 6 and 12 carbon atoms which can be substituted, preferably phenyl or dichlorophenyl,
- an aralkyl part having an alkyl part comprising between 5 and 14 carbon atoms and an aryl part comprising between 6 and 12 carbon atoms, optionally substituted on the aryl part by halogens, alkyls and/or alkoxyls comprising 1 to 3 carbon atoms, the symbols Z are alike or different and represent:
- an $R^1$ and/or $R^2$ group,
- a hydrogen radical,
- and/or a crosslinkable organofunctional group, preferably an epoxy functional, oxetane functional and/or dioxolane functional or alkenyl ether functional group, connected to the silicon of the polyorganosiloxane via a divalent radical comprising from 2 to 20 carbon atoms and which can comprise at least one heteroatom, preferably oxygen,
- with at least one of the symbols Z representing a crosslinkable organic functional group.

According to an advantageous alternative form of the invention, the polyorganosiloxanes used comprise from 1 to 10 organofunctional groups per macromolecular chain. For an epoxy functional group, this corresponds to epoxide levels varying from 20 to 2 000 molar meq/100 g of polyorganosiloxane.

In the case of the present invention, the nodes of the silicone matrix obtained are of polyether type.

The linear polyorganosiloxanes can be oils with a dynamic viscosity of the order of 10 to 10 000 mPa·s at 25° C., generally of the order of 20 to 5 000 mPa·s at 25° C. and more preferably still of 20 to 600 mPa·s at 25° C., or gums exhibiting a molecular mass of the order of 1 000 000.

When they are cyclic polyorganosiloxanes, the latter are composed of units (II) which can be, for example, of the dialkylsiloxy or alkylarylsiloxy type. These cyclic polyorganosiloxanes exhibit a viscosity of the order of 1 to 5 000 mPa·s.

Mention may be made, as examples of divalent radicals connecting an organofunctional group of epoxy and/or oxetane type, of those included in the following formulae:

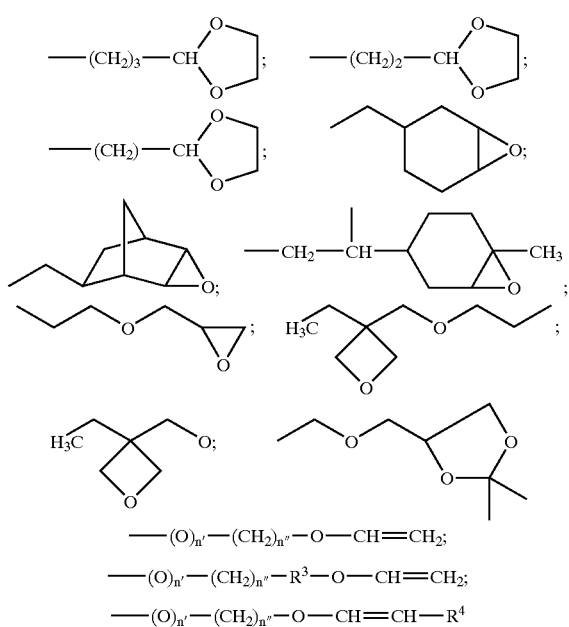

in which:

n' represents 0 or 1 and n" an integer between 1 and 5

$R^3$ represents:
- an optionally substituted, linear, cyclic or branched, $C_1$–$C_{12}$ alkylene radical,
- or a $C_5$–$C_{12}$ arylene radical, preferably a phenylene radical, which is optionally substituted, preferably by one to three $C_1$–$C_6$ alkyl groups, $R^4$ represents a linear or branched $C_1$–$C_6$ alkyl radical.

The linear polyorganosiloxanes can be oils with a dynamic viscosity of the order of 10 to 10 000 mPa·s at 25° C., generally of the order of 20 to 5 000 mPa·s at 25° C. and more preferably still of 20 to 600 mPa·s at 25° C., or gums exhibiting a molecular mass of the order of 1 000 000.

When they are cyclic polyorganosiloxanes, the latter are composed of units which can be, for example, of the dialkylsiloxy or alkylarylsiloxy type. These cyclic polyorganosiloxanes exhibit a viscosity of the order of 1 to 5 000 mPa·s.

The epoxy or vinyloxy functional polyorganosiloxanes are generally provided in the form of fluids exhibiting a viscosity at 25° C. of 10 to 10 000 mm²/s and preferably of 100 to 600 mm²/s.

The dynamic viscosity at 25° C. of all the silicones considered in the present description can be measured using a Brookfield viscometer according to the standard AFNOR NFT 76 102 of February 1972.

Compounds of this type are disclosed in particular in patents DE-A-No. 4 009 889; EP-A-No. 396 130; EP-A-No. 355 381; EP-A-No. 105 341; FR-A-No. 2 110 115 and FR-A-2 526 800.

The vinyloxy functional polyorganosiloxanes can be prepared by a hydrosilylation reaction between oils with Si—H units and vinyloxy functional compounds, such as allyl vinyl ether, allylvinyloxyethoxybenzene, and the like.

The epoxy functional polyorganosiloxanes can be prepared by a hydrosilylation reaction between oils with Si—H units and epoxy functional compounds, such as 4-vinylcyclohexene oxide, allyl glycidyl ether, and the like.

The oxetane functional polyorganosiloxanes can be prepared by hydrosilylation of unsaturated oxetanes or condensation of oxetanes including a hydroxyl functional group.

The dioxolane functional polyorganosiloxanes can be prepared by hydrosilylation of unsaturated dioxolanes.

The silicones corresponding best to the subject matter of the invention are described below and have at least one epoxide, alkenyl ether or oxetane group.

In the formulae below, X can represent an alkyl, cyclohexyl, trifluoropropyl, perfluoroalkyl, alkoxy or hydroxypropyl group, R a $C_1$ to $C_{10}$ alkyl, cyclohexyl, trifluoropropyl or $C_1$ to $C_{10}$ perfluoroalkyl radical, ($0 \leq a \leq 1\,000$) and ($1 \leq b \leq 1\,000$).

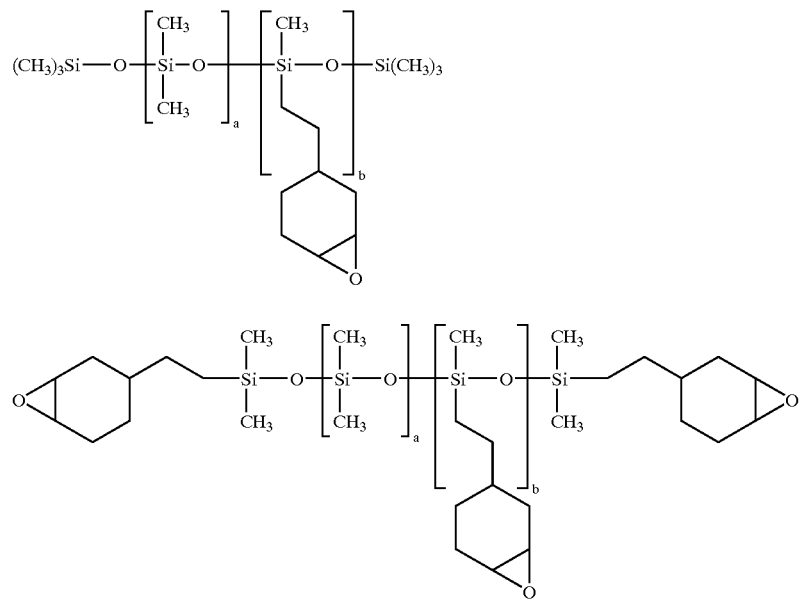

-continued
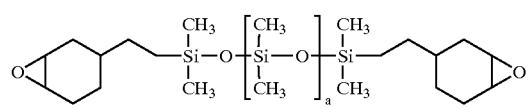 S3
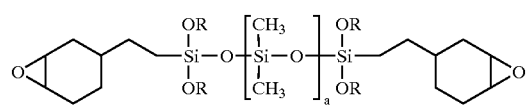 S4
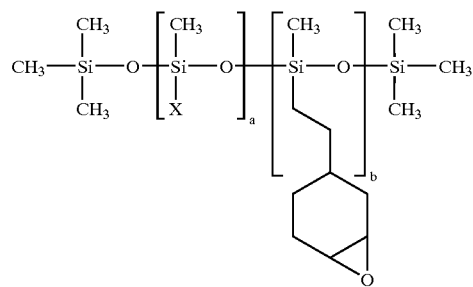 S5
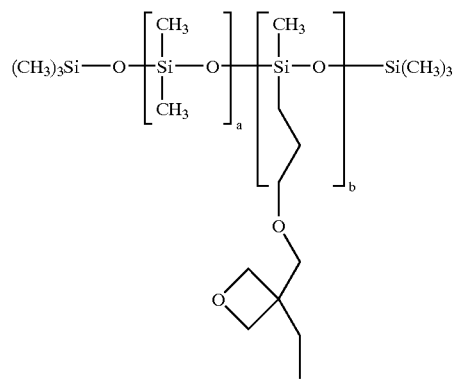 S6
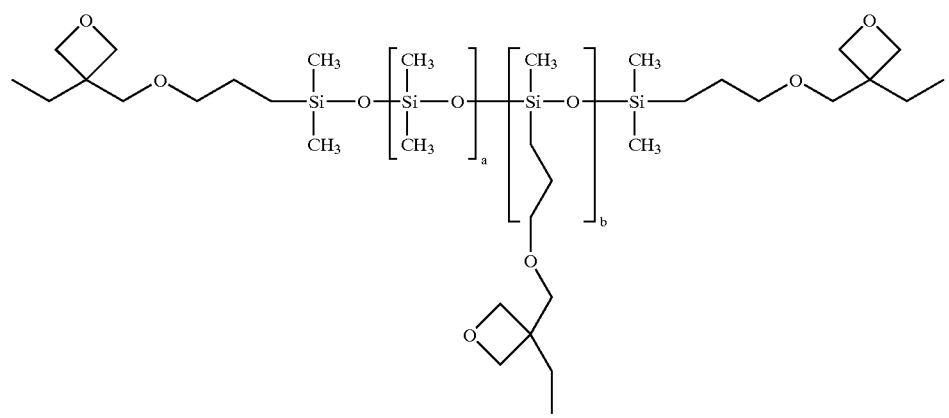 S7
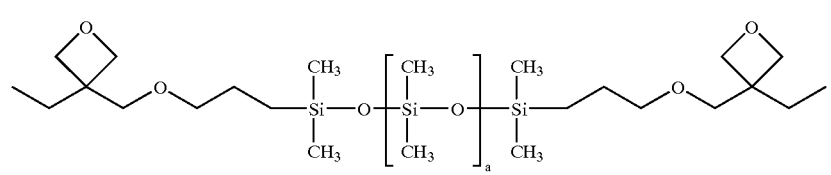 S8
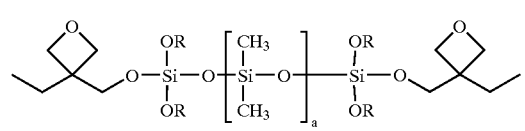 S9
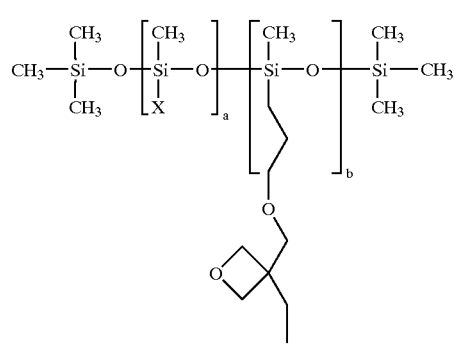 S10

S11
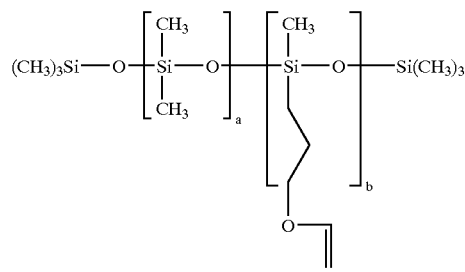

S12
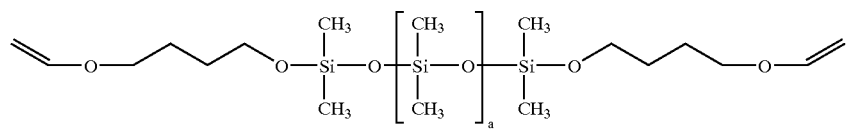

S13
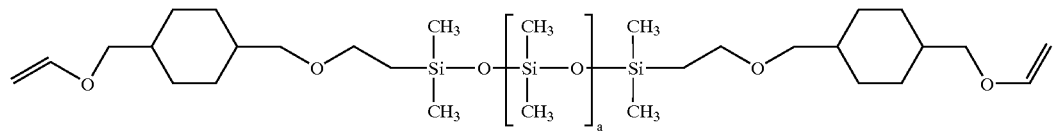

S14
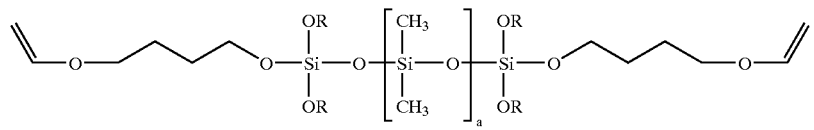

S15
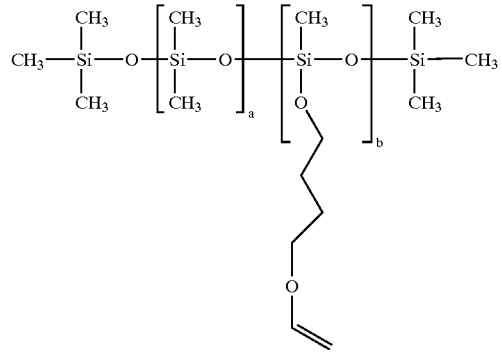

S16
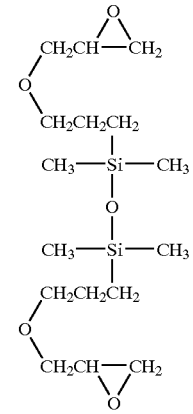

S17
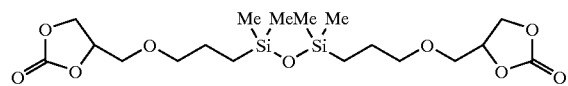

S18
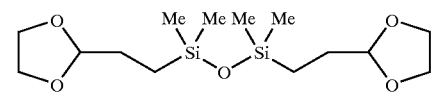

The reaction conditions for polymerization and/or crosslinking by photoactivation are the conventional conditions. They are generally initiated in the presence of a photoinitiator incorporated in the silicone matrix.

The conventional photoinitiators disclosed in patent EP 562 897 in particular are suitable. The conventional photoinitiators can also be corresponding iodonium or sulfonium salts of hexafluorophosphate or hexafluoroantimonate.

This initiator is, of course, present in an amount sufficient to activate and effective in activating the polymerization and/or crosslinking.

The term "effective amount of initiator" is understood to mean, according to the invention, the amount sufficient to initiate the polymerization and/or crosslinking. This amount is generally between 0.001 and 1 parts by weight, generally between 0.005 and 0.5 parts by weight, to polymerize and/or crosslink 100 parts by weight of the silicone coating.

According to a preferred alternative form of the invention, the silicone coating is a matrix based on an epoxidized silicone oil.

In addition to this catalyst, the components of the silicone coating can be combined with other additives.

They can be, for example, fillers, inorganic or not, and/or pigments, such as synthetic or natural fibers, calcium carbonate, talc, clay, titanium dioxide or fumed silica. This can make it possible to improve in particular the mechanical characteristics of the final materials.

Soluble dyes, oxidation inhibitors and/or any other material which does not interfere with the catalytic activity of the platinum complex and the regulating activity of the additive on the release force can also be added to the component of the silicone matrix.

As regards the adhesive, it is possible to choose an acrylic adhesive in the aqueous phase or in a solvent phase, a rubber in the aqueous phase or in a solvent phase, in hot-melt acrylics or gums, in latices or other appropriate adhesives.

Acrylic adhesives in the aqueous phase or preferably in a solvent phase are more particularly suitable for the invention.

Emulsions known as pressure-sensitive adhesive (PSA) emulsions, which are derived from acrylic polymers, are very commonly used adhesives for being coated at the surface of a wide variety of materials so as to obtain labels, tapes or any other self-adhesive material. They confer, on the material, the ability to adhere to the surface of a backing without requiring any other activation, than a slight pressure. Conventionally, PSAs are obtained by polymerization predominantly of alkyl acrylate monomers, which are generally present in a proportion of 50 to approximately 99% and preferably in a proportion of 80 to 99% by weight, and of copolymerizable polar monomers, such as, for example, acrylic acid, in lower proportions.

The monomers employed to prepare these PSAs are selected according to their glass transition temperature, Tg, in order to confer, on the polymers incorporating them, the expected behavior in terms of adhesion and of viscoelasticity. To this end, the monomers advantageously have a sufficiently low glass transition temperature, generally of between −70 and −10° C. and preferably is less than −30° C.

More specifically, these monomers are selected from the group consisting of (meth)acrylic esters, such as esters of acrylic acid and of methacrylic acid with hydrogenated or fluorinated $C_1$–$C_{12}$ alkanols, preferably $C_1$–$C_8$ alkanols, in particular methyl acrylate, ethyl acrylate, propyl acrylate, n-butyl acrylate, isobutyl acrylate, 2-ethylhexyl acrylate, tert-butyl acrylate, hexyl acrylate, heptyl acrylate, octyl acrylate, isooctyl acrylate, decyl acrylate, dodecyl acrylate, methyl methacrylate, ethyl methacrylate, n-butyl methacrylate or isobutyl methacrylate;

of vinyl nitriles, including more particularly those having from 3 to 12 carbon atoms, such as, in particular, acrylonitrile and methacrylonitrile;

of carboxylic acid vinyl esters, such as vinyl acetate, vinyl versatate or vinyl propionate, of unsaturated ethylenic mono- and dicarboxylic acids, such as acrylic acid, methacrylic acid, itaconic acid, maleic acid or fumaric acid, and the mono- and dialkyl esters of the mono- and dicarboxylic acids of the type mentioned with alkanols preferably having 1 to 8 carbon atoms and their N-substituted derivatives, of amides of unsaturated carboxylic acids, such as acrylamide, methacrylamide, N-methylolacrylamide or -methacrylamide, or N-alkylacrylamides, of ethylenic monomers comprising a sulfonic acid group and its alkali metal or ammonium salts, for example vinylsulfonic acid, vinylbenzenesulfonic acid, α-acrylamidomethylpropanesulfonic acid or 2-sulfoethylene methacrylate, of unsaturated ethylenic monomers comprising a secondary, tertiary or quaternary amino group or a nitrogen-comprising heterocyclic group, such as, for example, vinylpyridines, vinylimidazole, aminoalkyl (meth)acrylates and aminoalkyl(meth)acrylamides, such as dimethylaminoethyl acrylate or dimethylaminoethyl methacrylate, di(tert-butyl)aminoethyl acrylate or di(tert-butyl)aminoethyl methacrylate, dimethylaminomethylacrylamide or dimethylaminomethylmethacrylamide, of zwitterionic monomers, such as, for example, sulfopropyl(dimethyl)aminopropyl acrylate, of ethylenic monomers carrying a sulfate group, of ethylenic monomers carrying one or more phosphate and/or phosphonate functional group(s), and their mixtures.

Preferably, the monomers employed in the emulsion polymerization are predominantly alkyl(meth)acrylate monomers present in a proportion of 50% to approximately 99% and preferably in a proportion of 80% to 99% by weight with respect to the weight of monomers present in the emulsion.

More preferably, they are chosen from 2-ethylhexyl acrylate, butyl acrylate, hexyl acrylate, heptyl acrylate, octyl acrylate, isooctyl acrylate, decyl acrylate, isobutyl acrylate, dodecyl acrylate and their mixtures, methacrylates, such as n-butyl methacrylate, methacrylic acid, acrylic acid, itaconic acid, maleic acid and/or acrylamide.

The PSAs considered according to the present invention are generally prepared by emulsion polymerization of the corresponding monomers by the radical route at atmospheric pressure and at a temperature generally of between 10 and 90° C. Conventionally, this polymerization technique requires, in addition to the radical initiator, a mixture of anionic and/or nonionic emulsifiers for stabilizing said emulsion. It can also be carried out in the presence of at least one monomer known as a crosslinking agent.

These PSAs can, of course, be used in a formulated form, that is to say as a mixture with conventional additives for adhesives, such as wetting agents, tackifying agents, and the like.

Conventionally, the complexes according to the invention can additionally comprise one or more additives selected according to the final application targeted.

The additives can in particular be compounds, optionally in the form of polymers, comprising mobile hydrogens, such as alcohols, glycols and polyols, of use for improving the flexibility in particular of the silicone matrix after polymerization and/or crosslinking; mention may be made, for example, of polycaprolactone polyols, in particular the polymer obtained starting from 2-ethyl-2-(hydroxymethyl)-1,3-propanediol and from 2-oxepanone, such as the product Tone Polyol-301, sold by Union Carbide, or the other commercial polymers Tone Polyol 201 and Tone Polyol 12703 from Union Carbide. Mention may also be made, as additives, of the diacids comprising a long alkyl chain, fatty esters of unsaturated acids which may or may not be epoxidized, for example epoxidized soybean oil or epoxidized linseed oil, epoxidized 2-ethylhexyl ester, 2-ethylhexyl epoxystearate, octyl epoxystearate, epoxidized acrylic esters, epoxidized soybean oil acrylates, epoxidized linseed oil acrylates, the diglycidyl ether of polypropylene glycol, aliphatic epoxides comprising a long chain, and the like.

They can also be, whatever the nature of the polymerizable matrix, for example: fillers, such as in particular ground synthetic fibers (polymers) or natural fibers, calcium carbonate, talc, clay, titanium dioxide, precipitated silica or pyrogenic silica; soluble dyes; oxidation inhibitors and corrosion inhibitors; organosilicic or nonorganosilicic adhesion adjusters; fungicidal, bactericidal or antimicrobial agents; and/or any other material which does not interfere with the activity of the additive in accordance with the invention.

The amounts of coating deposited on the backings are variable.

The amounts of silicone coating generally range between 0.1 and 5 g/m² of surface treated. These amounts depend on the nature of the backings and on the desired nonstick properties. They are generally between 0.5 and 1.5 g/m² for nonporous backings.

As regards the amounts of adhesive coating, they are preferably less than 200 g/m² and more preferably less than 100 g/m².

The backings can be a metallic material, such as tinplate, preferably a cellulose material of paper or board type, for example, or a polymeric material of vinyl type. Thermoplastic polymeric films, such as polyethylene, polypropylene or polyester, are particularly advantageous.

In the embodiment where the adhesive coating is in contact with a backing composed of a second material, this second material can be selected from the materials proposed for the first backing and may or may not be identical in nature to the first backing. The adhesive coating can be applied according to various methods. It can in particular be deposited by transfer.

Finally, the backing to which the silicone coating and/or the adhesive coating is applied may already be coated with an initial coating with which is superimposed a coating in accordance with the invention, with the proviso that this additional coating is transparent to UV radiation.

Another subject matter of the present invention is the articles (sheets, tapes, for example) comprising a complex in accordance with the invention. They can in particular be labels, self-adhesive sheets or adhesive tapes.

A second aspect of the present invention relates to the use of an additive as defined above in a silicone coating in accordance with the invention and intended to form a silicone/adhesive complex as defined above for the stabilization of the release forces of a silicone/adhesive interface by photochemical activation of said additive.

The examples and figures which appear below are presented by way of illustration of and without implied limitation of the subject matter of the present invention.

FIGURES

FIG. 1: Change in the level of adhesion as a function of the number of passes under the UV lamp, additive free UV formulation. Adhesive Tesa® 4970.

Figure 2:
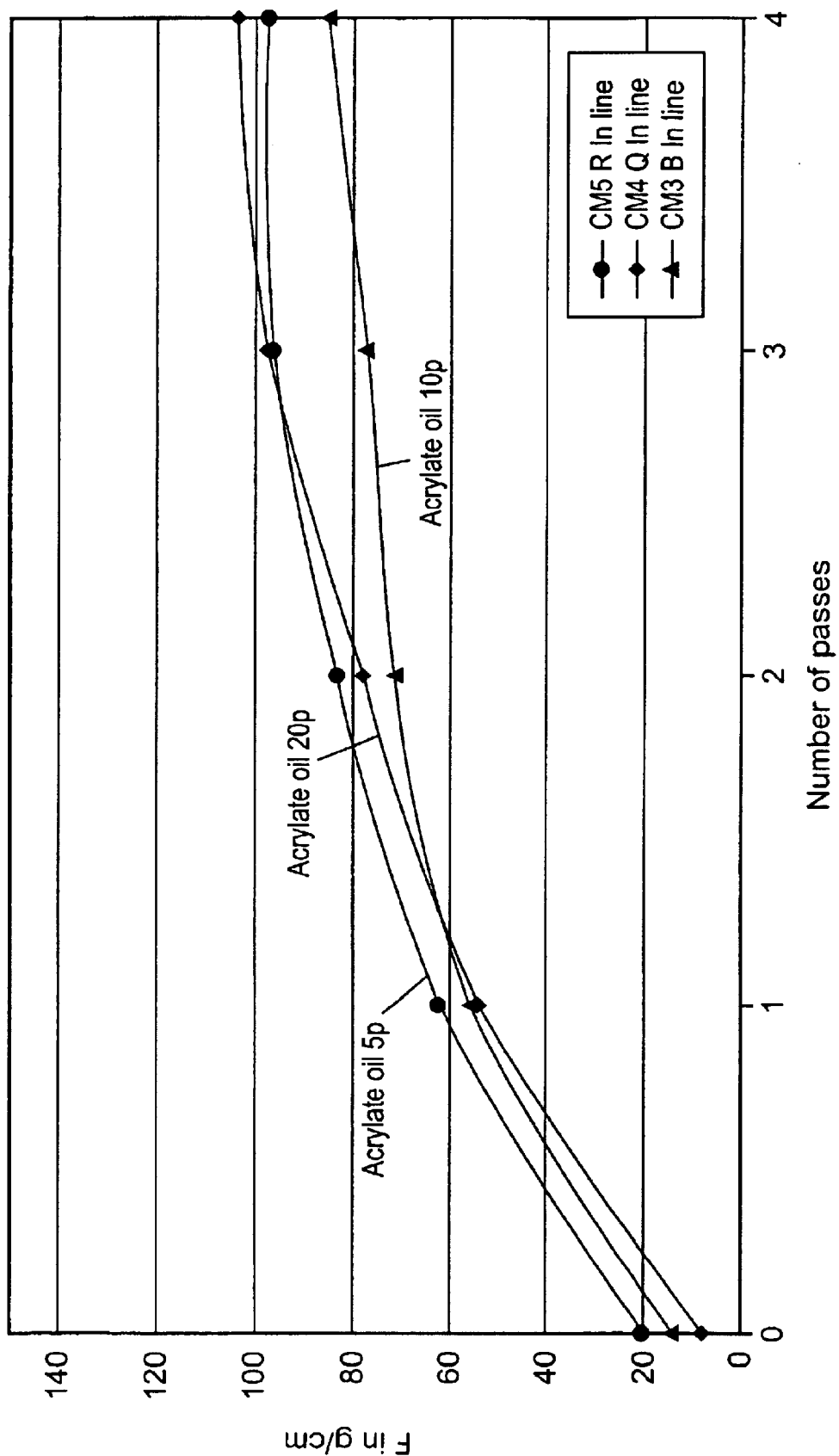

FIG. 2: Change in the level of adhesion as a function of the number of passes under the UV lamp of a UV formulation comprising different levels of additives composed of silicone acrylate. Adhesive Tesa® 4970.

Figure 3:
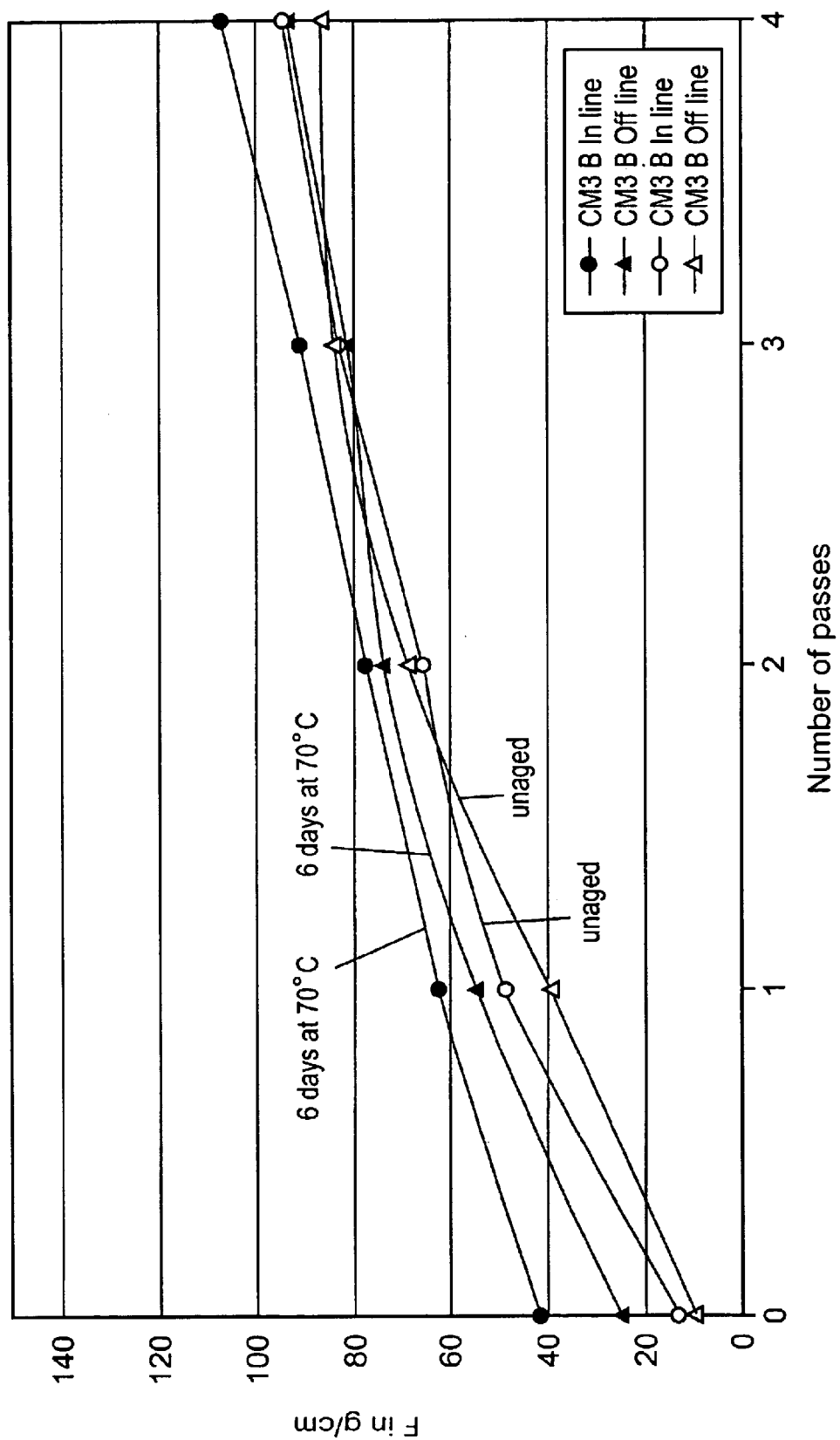

FIG. 3: Change in the level of adhesion as a function of the number of passes under the UV lamp before and after a cycle of aging for 6 d at 70° C. UV formulation with silicone acrylate additive. Adhesive Tesa® 4970.

Figure 4:
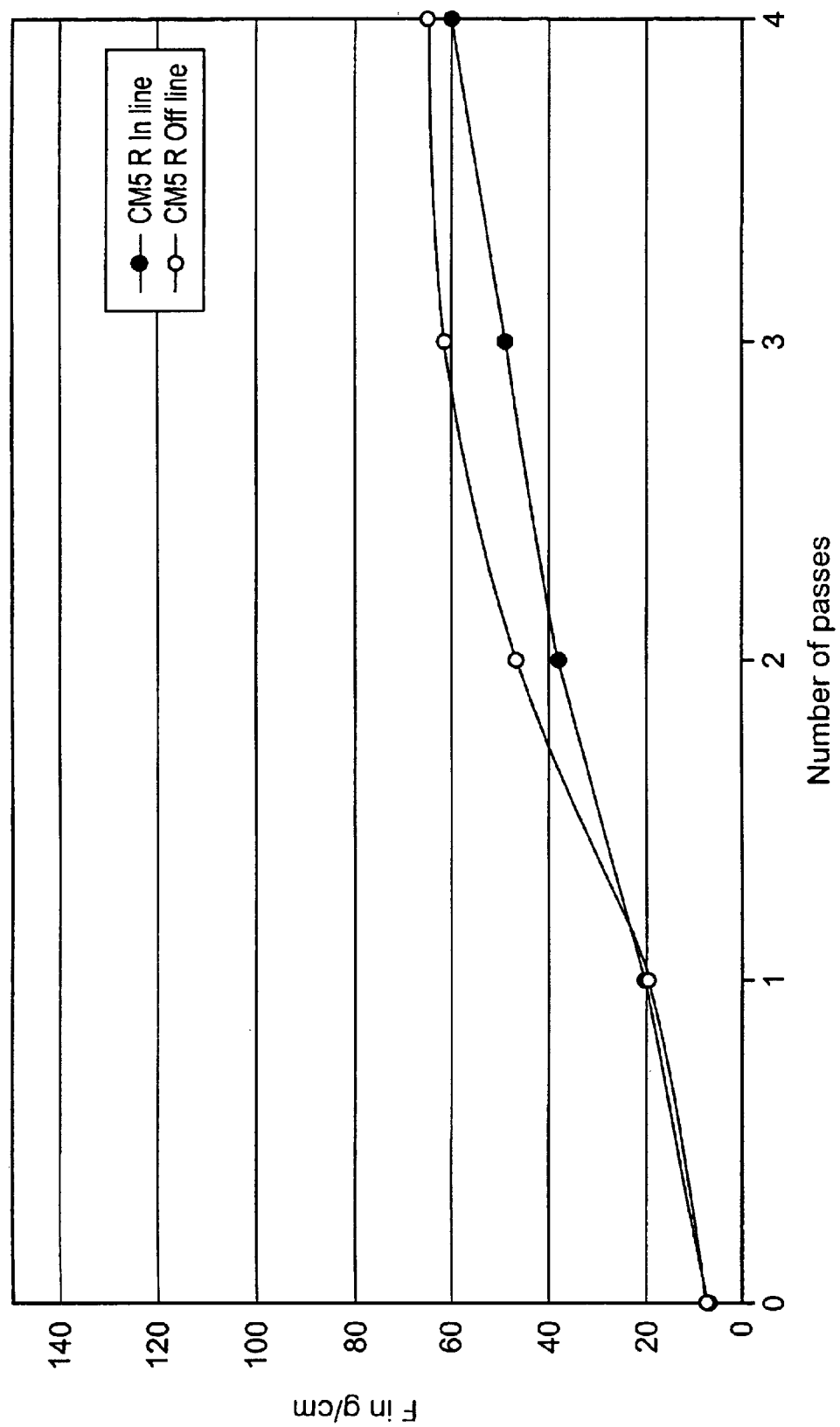

FIG. 4: Change in the level of adhesion as a function of the number of passes under the UV lamp. UV formulation with 5% of acrylate oil. Adhesive Rhodatak® 315P.

Figure 5:
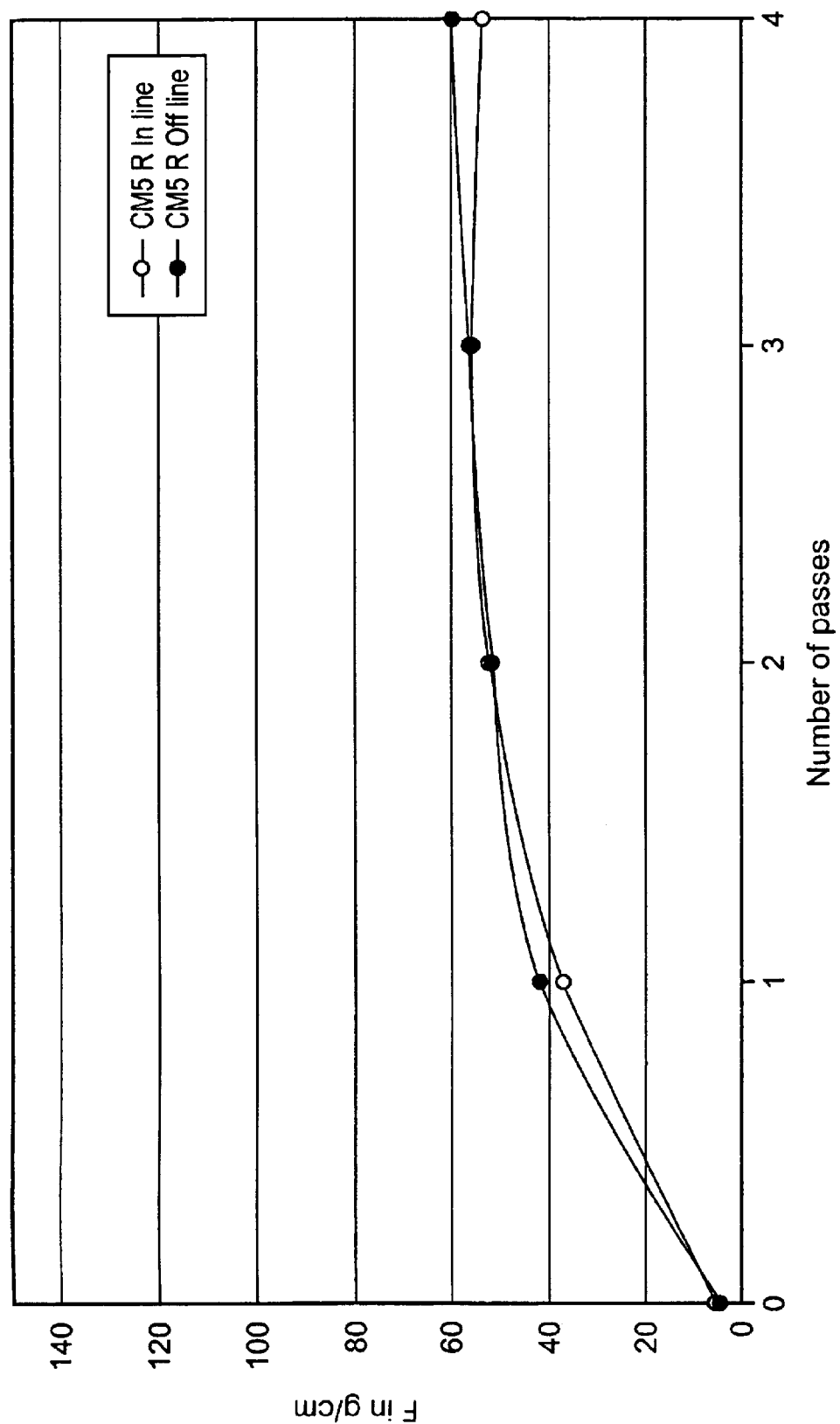

FIG. 5: Change in the level of adhesion as a function of the number of passes under the UV lamp. UV formulation with 5% of acrylate oil. Adhesive Rhodotak® 338J.

Figure 6:
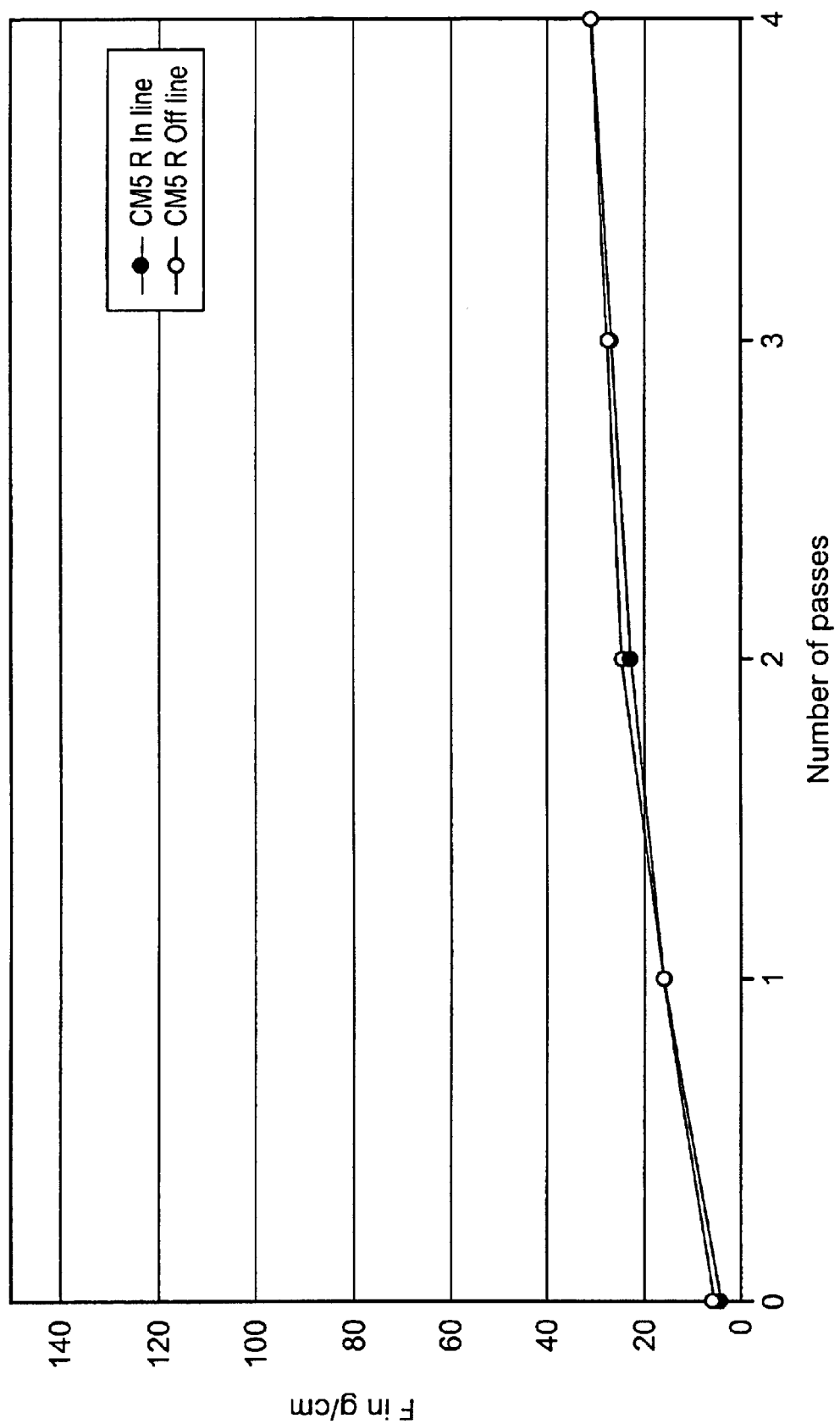

FIG. 6: Change in the level of adhesion as a function of the number of passes under the UV lamp. UV formulation with 5% of acrylate oil. Adhesive Rhodotak® 300.

Figure 7:
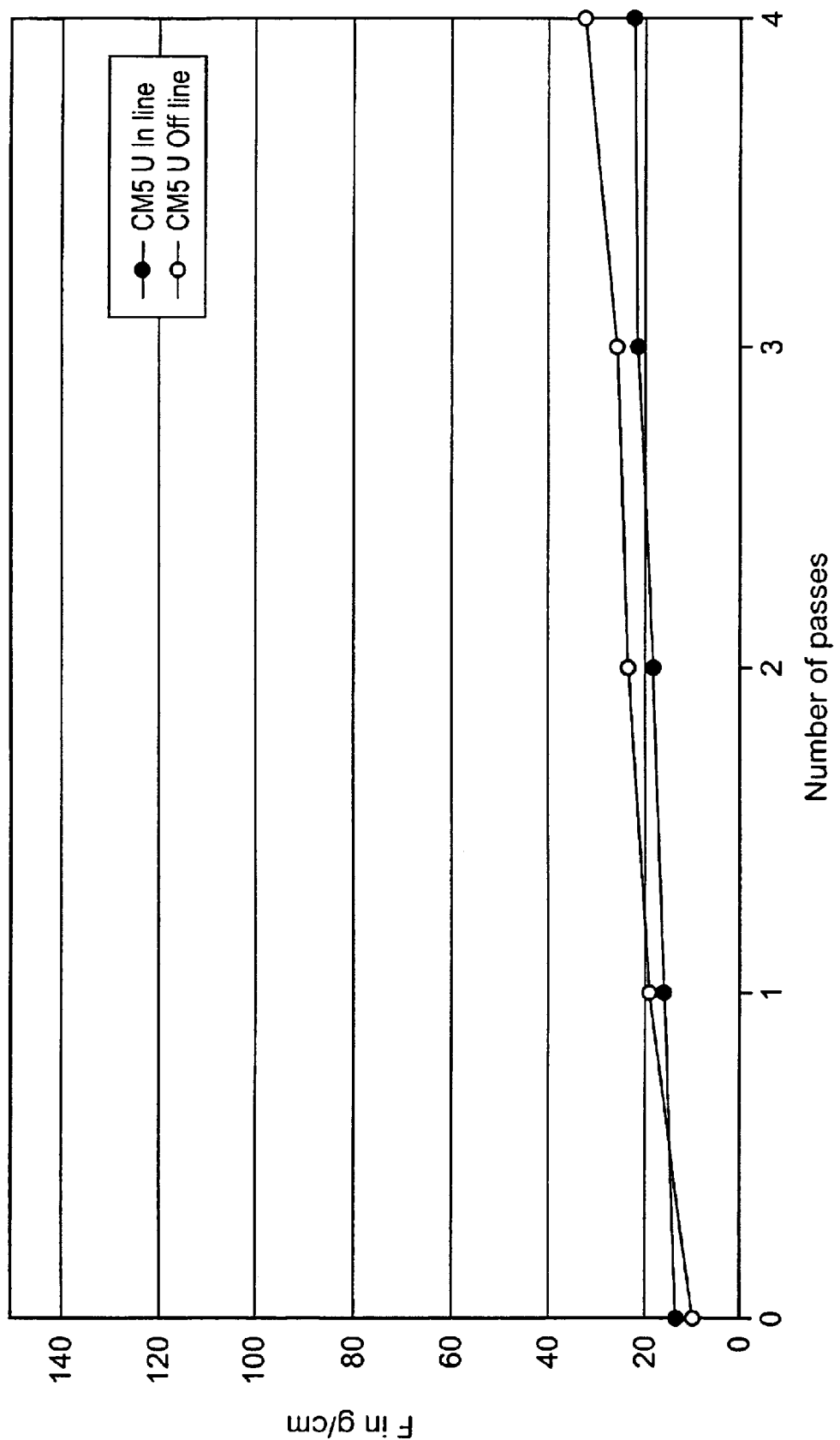

FIG. 7: Change in the level of adhesion as a function of the number of passes under the UV lamp of a formulation comprising 0.34% of TMPTA as additive. Adhesive Tesa® 4970.

Figure 8:
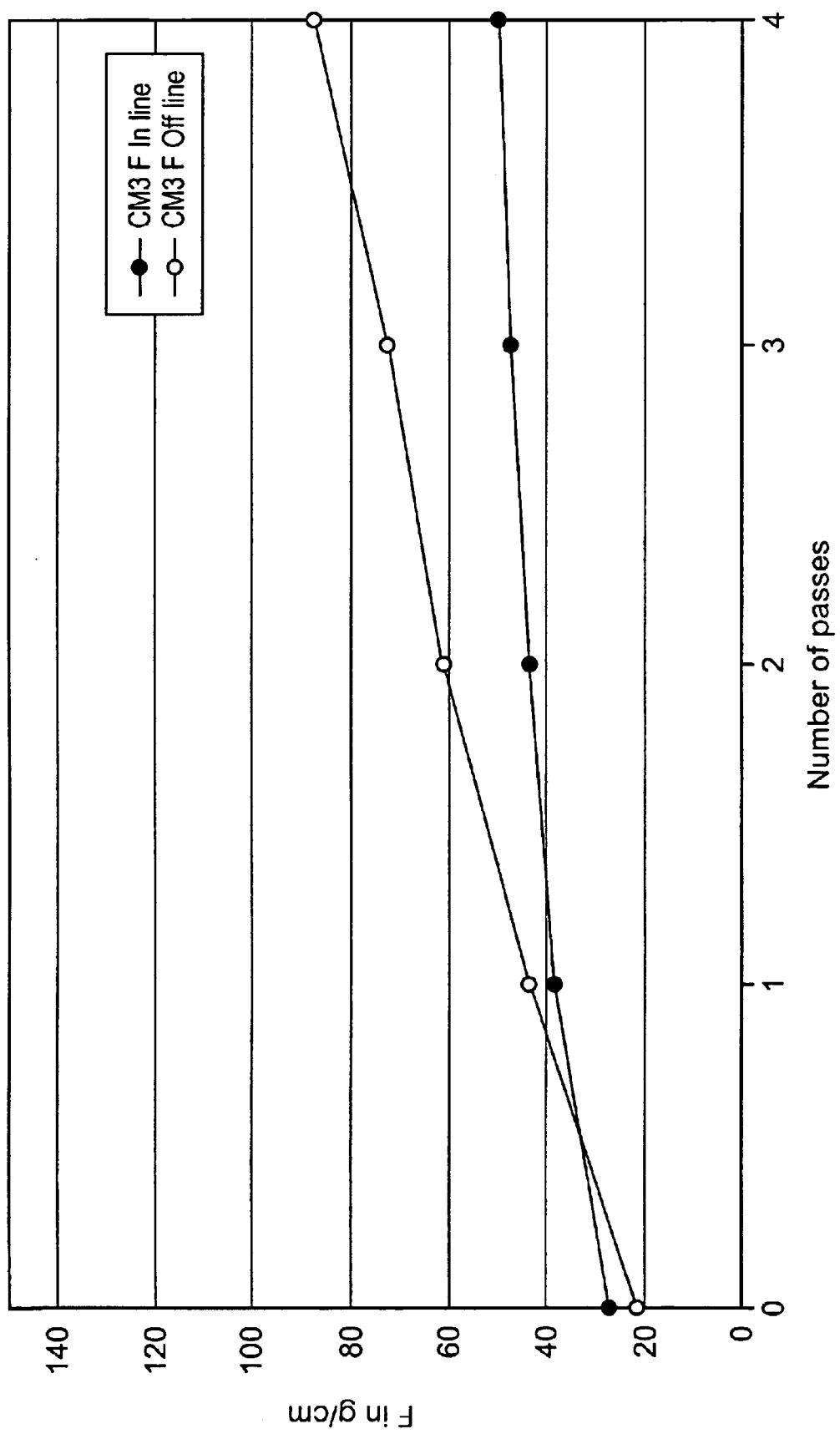

FIG. 8: Change in the level of adhesion as a function of the number of passes under the UV lamp of a formulation comprising 5% of TMPTA as additive. Adhesive Tesa® 4970.

Figure 9:
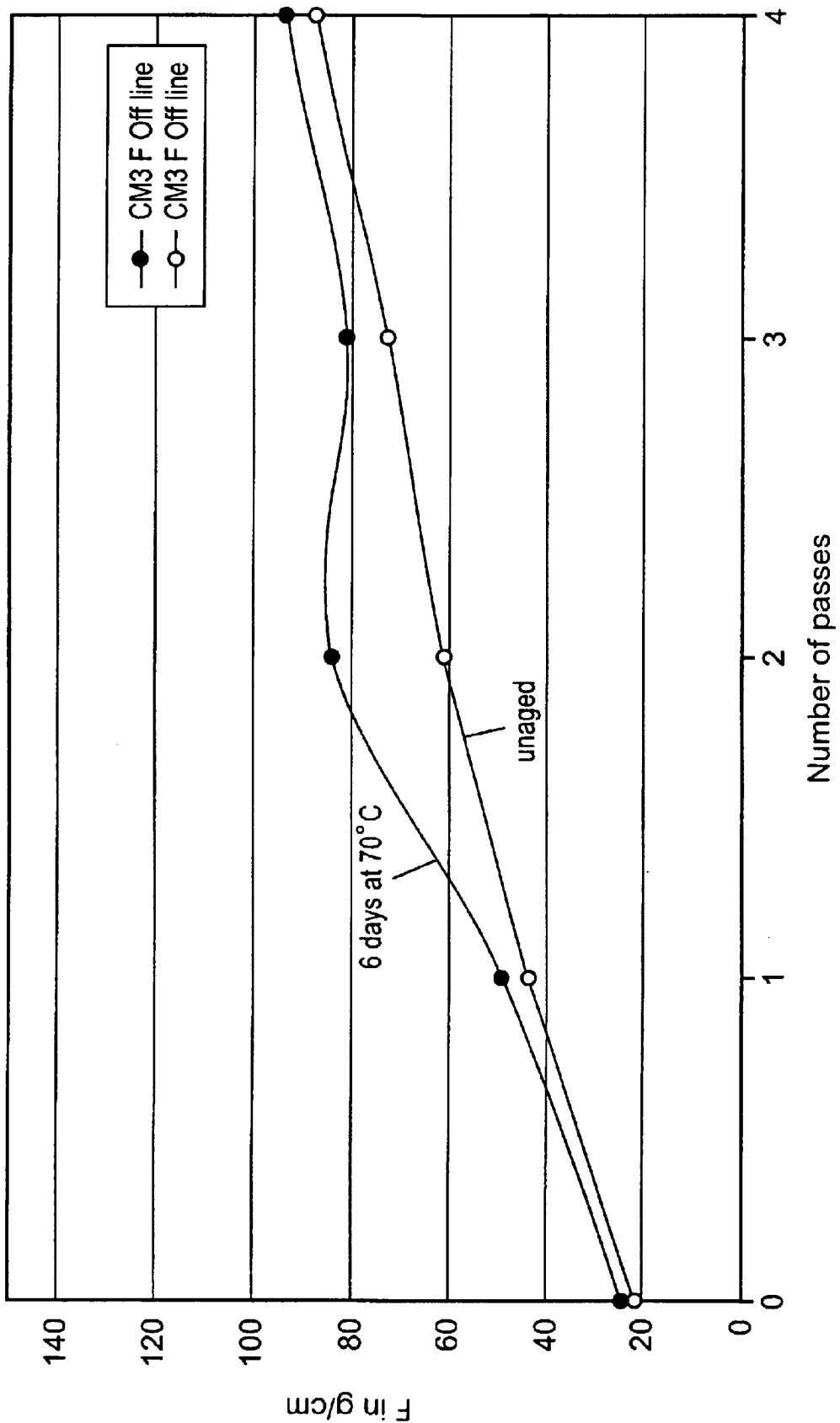

FIG. 9: Change in the level of adhesion as a function of the number of passes under UV radiation before and after an aging cycle (6 days at 70° C.) UV formulation with 5% of TMPTA. Adhesive Tesa® 4970.

Figure 10:
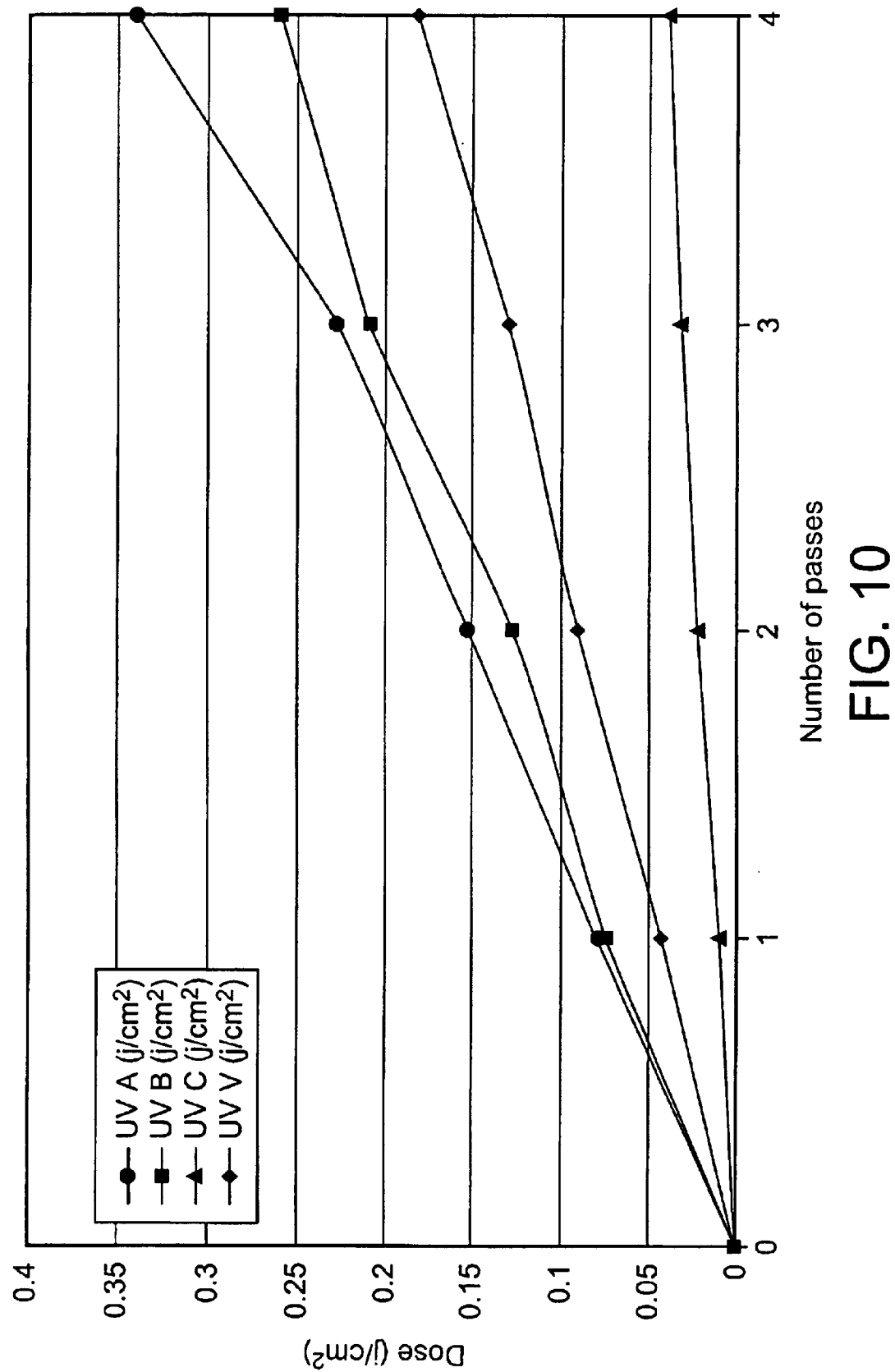

FIG. 10: Graphical representation of the intensity of the dose of UV irradiation emitted as a function of the number of passes under the UV lamp (IST unit/rate 50 m/min/P 160 W/cm).

MATERIALS AND METHOD

In the examples which follow, use is made of a silicone formulation composed of a cationic UV system developed by Rhodia Chimie with these additives.

The nonstick UV system is composed:
of an epoxidized oil of formula:

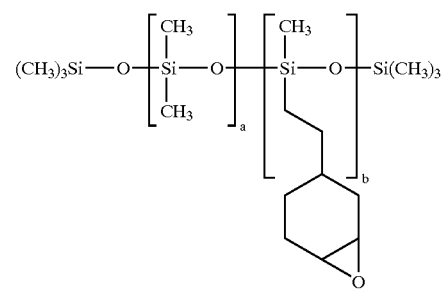

It corresponds to the mean structure with a random distribution such that a=80; b=7.

of a cationic photoinitiator (PI₁ in isopropanol):

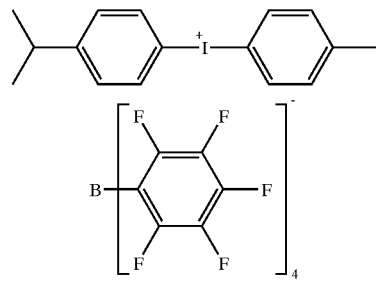

The additives in accordance with the invention which are tested are:
a silicone oil with acrylate functional groups, of the Rhodia range: Silcolease® resin 21621,
an organic acrylic monomer: trimethylpentanediol triacrylate.

The formulations are coated at a rate of 50 m/min on a polypropylene film using a Rotomec pilot coater. The corresponding silicone coating is crosslinking by passing under an 80 W/cm Fusion UV lamp (H⁺ tube). The coating are of the order of 1.2 g/M² to provide good coverage of the backing.

The coating is subsequently adhesively attached to an acrylic adhesive tape Tesa® 4970.

The complex thus formed is subsequently subjected to irradiation with a UV lamp (IST lamp/mercury arc tube) at a rate of 50 m/min. This irradiation is carried out through the polypropylene backing film and the silicone layer.

Several passes under the lamp can be carried out. The dose received as a function of the number of passes carried out under the UV lamp is reported in FIG. 10; this measurement is carried out using a Power Puck® from EIT. The complex is subsequently separated by a peel test. This peel test is carried out with an angle of 180° and a rate of 300 mm/min, as described in the Finat3 standard.

The adhesion value is compared with that obtained on a nonirradiated complex.

EXAMPLE 1

The silicone formulation used is the epoxidized oil identified in "Materials and Method".

The additive used is the silicone acrylate oil described above. It is added at 3 different concentrations: 5, 10 and 20% by weight of the silicone coating.

The compositions are given (by weight) in detail in the following table I:

TABLE I

| Formulation    | EDCM3A | EDCM5R | EDCM3B | EDCM4Q |
|----------------|--------|--------|--------|--------|
| Epoxidized oil | 100    | 95     | 90     | 80     |
| Photoinitiator | 2.5    | 2.5    | 2.5    | 2.5    |
| Acrylate oil   | 0      | 5      | 10     | 20     |

At these contents, the additive is fully miscible. The coating on the polypropylene backing and the polymerization of the corresponding mixtures do not raise any problem: no manifestation of oily appearance, of dewetting or of rub off.

These coatings are subsequently adhesively attached to an adhesive tape Tesa® 4970. Two types of application of the adhesive are carried out: either instantaneously after polymerization (according to an inline process) or 15 minutes after coating/polymerization (according to an offline process). They are subsequently subjected, in the hour which follows the manufacture of the complex, to various irradiation cycles. These cycles consist in carrying out one or more successive passes under the UV lamp of the IST unit adjusted to a power of 160 W/cm and to a rate of passage of 50 m/min. The adhesive strength of the Tesa® 4970 is measured in the course of the day using the peel test defined above. The results obtained are presented in FIGS. 1 and 2.

It is noticed that the irradiation leads to an increase in the release force for the formulations comprising the additive in accordance with the present invention. On the other hand, there is no effect of the irradiation on the formulation without additive. Evidently, the concentration of additive also has an impact on the release force. This is because the release force varies as a function of the concentration of additive. Furthermore, the release force increases virtually linearly with the number of passes under the UV lamp. Forces of 100 g/cm (40 cN/inch) are thus achieved after 4 passes.

To evaluate the stability of the adjusting effect obtained, the formulation in accordance with the invention was furthermore tested on conclusion of an accelerated aging cycle. This cycle is applied in particular by subjecting the complex for 6 days to a temperature of 70° C. These conditions are supposed to represent natural aging of the complex for a period of 6 months.

The results obtained are presented in FIG. 3.

Three other adhesive tapes of the Rhodotak® range from Rhodia were also evaluated with the formulation comprising 5% of acrylate oil. They are Rhodotak® 315P: untackified permanent acrylic adhesive
Rhodotak® 338J: tackified permanent acrylic adhesive
Rhodotak® 300: removable acrylic adhesive The adhesion results are recorded in FIGS. 4/5/6. An increase in the release force with the number of passes under the UV lamp is noticed with all these adhesives.

EXAMPLE 2

In this example, the additive tested is trimethylpentanediol triacrylate (TMPTA).

The formulations to which it has been added are the compositions presented in table II:

TABLE II

| Formulation      | EDCM3A | EDCM5U | EDCM3F |
|------------------|--------|--------|--------|
| Epoxidized oil   | 100    | 99.66  | 100    |
| Photoinitiator   | 2.5    | 2.5    | 2.5    |
| Acrylic additive | 0      | 0.34   | 5      |

The TMPTA was added thereto at two levels: 0.34 and 5% by weight.

The mixture with 0.34% is miscible, whereas the mixture with 5% is immiscible.

The processing conditions are identical to those used in the preceding example.

The coating on the polypropylene backing and the polymerization of the mixtures do not raise any problem.

As above, these coatings are adhesively attached to the adhesive Tesa® 4970 and the complex is irradiated under various conditions.

The adhesive strength is measured using the peel test. The results obtained are represented in FIGS. 7 and 8.

An increase in the release force with the number of irradiation cycles and an effect of the concentration of additive on said force are noticed.

The stability of the strengths of the adhesiveness after an aging cycle as defined in the preceding example is represented in FIG. 9 this stability is satisfactory.

What is claimed is:

1. A method for regulating the release force of a silicone/adhesive interface, in a silicone/adhesive complex comprising applying at least one silicone coating to a first backing and applying one adhesive coating to a second backing, wherein said silicone coating derives from the polymerization and/or crosslinking by the cationic route of polyorganosiloxane monomers, oligomers and/or polymers carrying, as reactive groups, at least epoxy, oxetane, dioxolane and/or alkenyl ether functional groups and in that the coating further comprises at least one additive for regulating the release force of the silicone/adhesive interface and wherein the activity of said additive is photochemically initiatable and adjustable, wherein the additive for regulating the release force is an organic acrylic selected from acrylate entities selected from the group consisting of epoxidized acrylates, acrylic glyceryl polyesters, multifunctional acrylates, acrylic urethanes, acrylic polyethers, acrylic polyesters, and unsaturated polyesters.

2. The method as claimed in claim 1, wherein the two backings are composed of two separate entities, positioned so that the silicone coating of the first backing is in contact with the adhesive coating of the second backing.

3. The method as claimed in claim 1, wherein the two backings are composed respectively of each of the two faces of the same entity.

4. The method as claimed in claim 1, wherein the activity of the additive for regulating the release force is initiated and adjustable by exposure of at least the silicone/adhesive interface to at least one UV irradiation.

5. The method as claimed in claim 1, wherein the additive for regulating the release force is employed in a proportion of 0.1 to 20% by weight of the total silicone mixture.

6. The method as claimed in claim 1, wherein the polyorganosiloxane monomers, oligomers and/or polymers with organofunctional groups comprise units of formula (II) and are terminated by units of formula (I) or cyclics comprising units of formula (II) represented below:

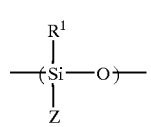
(II)

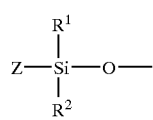
(I)

in which:
the symbols $R^1$ and $R^2$ are alike or different and represent:
  a linear or branched alkyl radical comprising 1 to 8 carbon atoms, optionally substituted by at least one halogen,
  a cycloalkyl radical comprising between 5 and 8 cyclic carbon atoms, which radical is optionally substituted,
  an aryl radical comprising between 6 and 12 carbon atoms which can be substituted,
  an aralkyl part having an alkyl part comprising between 5 and 14 carbon atoms and an aryl part comprising between 6 and 12 carbon atoms, optionally substituted on the aryl part by halogens, alkyls and/or alkoxyls comprising 1 to 3 carbon atoms,
the symbols Z are alike or different and represent:
  an $R^1$ and/or $R^2$ group,
  a hydrogen radical,
  and/or a crosslinkable organofunctional group, connected to the silicon of the polyorganosiloxane via a divalent radical comprising from 2 to 20 carbon atoms and which can comprise at least one heteroatom,
  and at least one of the symbols Z representing a crosslinkable organic functional group.

7. The method as claimed in claim 6, wherein the organofunctional groups are selected from the group consisting of:

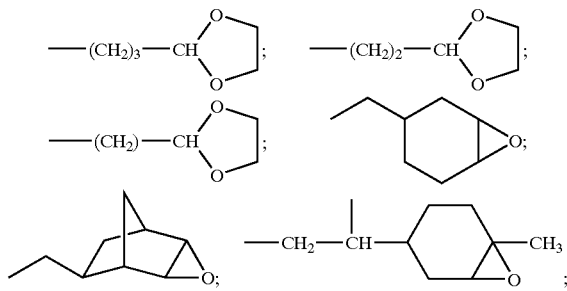

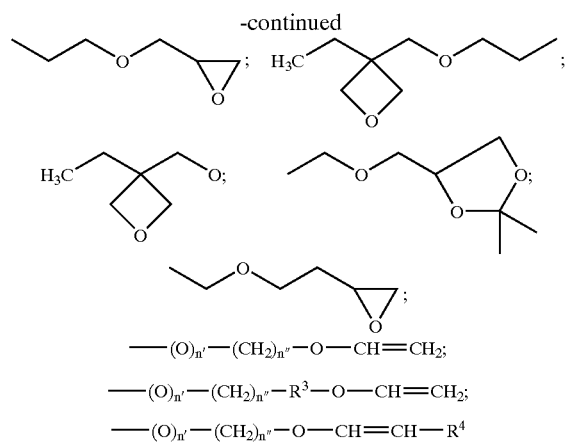

—$(O)_{n'}$—$(CH_2)_{n''}$—O—CH=CH$_2$;

—$(O)_{n'}$—$(CH_2)_{n''}$—$R^3$—O—CH=CH$_2$;

—$(O)_{n'}$—$(CH_2)_{n''}$—O—CH=CH—$R^4$ in which:
  n' represents 0 or 1 and n" an integer between 1 and 5
  $R^3$ represents:
    an optionally substituted, linear, cyclic or branched, $C_1$–$C_{12}$ alkylene radical,
    or a $C_5$–$C_{12}$ arylene radical, which is optionally substituted,
  $R^4$ represents a linear or branched $C_1$–$C_6$ alkyl radical.

8. The method as claimed in claim 1, wherein the silicone coating is a matrix based on an epoxidized silicone oil.

9. The method as claimed in claim 1, wherein the adhesive coating derives from a pressure-sensitive adhesive emulsion deriving from acrylic polymers.

10. The method as claimed in claim 9, wherein the pressure-sensitive adhesive emulsion is obtained by polymerization predominantly of acrylate monomers, present in a proportion of 50 to approximately 90% by weight, and, if appropriate, of copolymerizable radical monomers.

11. The method as claimed in claim 10, wherein the monomers are selected from the group consisting:
  of (meth)acrylic esters comprising esters of acrylic acid and of methacrylic acid with hydrogenated or fluorinated $C_1$–$C_{12}$ alkanols;
  of vinyl nitrites comprising those having from 3 to 12 carbon atoms;
  of carboxylic acid vinyl esters,
  of unsaturated ethylenic mono- and dicarboxylic acids, and the mono- and dialkyl esters of the mono- and dicarboxylic acids of the type mentioned with alkanols having 1 to 8 carbon atoms and their N-substituted derivatives,
  of amides of unsaturated carboxylic acids,
  of ethylenic monomers comprising a sulfonic acid group and its alkali metal or ammonium salts,
  of unsaturated ethylenic monomers comprising a secondary, tertiary or quaternary amino group or a nitrogen-comprising heterocyclic group,
  of zwitterionic monomers,
  of ethylenic monomers carrying a sulfate group,
  of ethylenic monomers carrying one or more phosphate and/or phosphonate functional group(s),
  and their mixtures.

12. A method for regulating the release force of a silicone/adhesive interface, in a silicone/adhesive complex comprising applying at least one silicone coating to a first backing and applying one adhesive coating to a second backing, wherein said silicone coating derives from the polymerization and/or crosslinking by the cationic route of polyorganosiloxane monomers, oligomers and/or polymers carrying, as reactive groups, at least epoxy, oxetane, dioxolane and/or alkenyl ether functional groups and in that the coating further comprises at least one additive for regulating the release force of the silicone/adhesive interface and wherein the activity of said additive is photochemically initiatable and adjustable, wherein the additive for regulating the release force is an acrylic silicone and/or a silicone with alkenyl ether functional groups.

13. The method as claimed in claim 12, wherein the acrylic silicones comprise polyorganosiloxanes with an acrylate and/or methacrylate functional group which are bonded to the polysiloxane chain via an Si—C bond.

* * * * *

UNITED STATES PATENT AND TRADEMARK OFFICE
CERTIFICATE OF CORRECTION

PATENT NO. : 6,849,340 B1
DATED : February 1, 2005
INVENTOR(S) : Didier Dhaler et al.

It is certified that error appears in the above-identified patent and that said Letters Patent is hereby corrected as shown below:

Title page,
Item [54], Title, delete "CARBON-CURABLE..." and insert
-- CATION-CURABLE.... --.

Signed and Sealed this

Ninth Day of August, 2005

JON W. DUDAS
*Director of the United States Patent and Trademark Office*